(12) United States Patent
Riedijk (10) Patent No.: US 9,600,705 B2
(45) Date of Patent: Mar. 21, 2017

(54) CAPACITIVE FINGERPRINT SENSING DEVICE WITH CURRENT READOUT FROM SENSING ELEMENTS

(71) Applicant: FINGERPRINT CARDS AB, Göteborg (SE)

(72) Inventor: Frank Robert Riedijk, Delft (NL)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 14/872,510

(22) Filed: Oct. 1, 2015

(65) Prior Publication Data

US 2016/0232394 A1 Aug. 11, 2016

(30) Foreign Application Priority Data

Feb. 11, 2015 (SE) ..................................... 1550152

(51) Int. Cl.
*G06K 9/00* (2006.01)
*G06F 3/044* (2006.01)

(52) U.S. Cl.
CPC ........... *G06K 9/0002* (2013.01); *G06F 3/044* (2013.01)

(58) Field of Classification Search
CPC ............................. G06K 9/0002; G06F 3/044
See application file for complete search history.

(56) References Cited

U.S. PATENT DOCUMENTS

| | | | | |
|---|---|---|---|---|
| 5,920,309 A | * | 7/1999 | Bisset | G06F 3/044 178/18.06 |
| 6,424,375 B1 | * | 7/2002 | Fowler | H04N 5/3355 250/214 R |
| 6,493,030 B1 | * | 12/2002 | Kozlowski | H01L 27/14609 250/208.1 |
| 6,778,686 B1 | * | 8/2004 | Hestnes | G01B 7/004 382/124 |
| 7,864,992 B2 | | 1/2011 | Riedijk et al. | |
| 8,692,795 B1 | * | 4/2014 | Kremin | G06F 3/044 345/173 |
| 9,152,841 B1 | * | 10/2015 | Riedijk | G06K 9/0002 |
| 9,323,975 B2 | * | 4/2016 | Riedijk | G06K 9/00013 |
| 9,383,876 B2 | * | 7/2016 | Riedijk | G06F 3/044 |
| 2005/0068438 A1 | * | 3/2005 | Kozlowski | H01L 27/146 348/308 |
| 2005/0068439 A1 | * | 3/2005 | Kozlowski | H03F 3/005 348/308 |

(Continued)

*Primary Examiner* — Aaron W Carter
(74) *Attorney, Agent, or Firm* — Remarck Law Group PLC (57) ABSTRACT

The present invention relates to a capacitive fingerprint sensing device comprising a plurality of sensing elements. Each sensing element includes a protective dielectric top layer to be touched by a finger; an electrically conductive sensing structure arranged underneath the top layer; a charge amplifier connected to the sensing structure for providing a sensing voltage signal indicative of a change of a charge carried by the sensing structure resulting from a change in a potential difference between the finger and the sensing structure; and a voltage-to-current converter for converting the sensing voltage signal to a sensing current signal indicative of the change of charge carried by the sensing structure. Hereby, accurate sensing as well as faster operation of the sensing elements can be achieved without a corresponding increase in power consumption.

13 Claims, 7 Drawing Sheets

(56) References Cited

U.S. PATENT DOCUMENTS

| | | | | |
|---|---|---|---|---|
| 2005/0077911 A1* | 4/2005 | Miyasaka | G06K 9/0002 | 324/662 |
| 2008/0069413 A1* | 3/2008 | Riedijk | G06K 9/0002 | 382/124 |
| 2010/0026527 A1* | 2/2010 | Nishimura | G06F 3/044 | 341/5 |
| 2010/0134438 A1* | 6/2010 | Yu | G06F 3/044 | 345/174 |
| 2012/0268145 A1* | 10/2012 | Chandra | G06F 3/044 | 324/686 |
| 2012/0326734 A1* | 12/2012 | Cho | G06F 3/0416 | 324/684 |
| 2013/0169582 A1* | 7/2013 | Ryshtun | G06F 3/0416 | 345/174 |
| 2014/0266262 A1* | 9/2014 | Taghibakhsh | G06K 9/0002 | 324/686 |
| 2015/0015537 A1* | 1/2015 | Riedijk | G06K 9/0002 | 345/174 |
| 2015/0169932 A1* | 6/2015 | Riedijk | G06K 9/00013 | 348/77 |
| 2015/0286335 A1* | 10/2015 | Haga | G06F 3/0418 | 345/174 |
| 2015/0310248 A1* | 10/2015 | Riedijk | G06K 9/0002 | 382/124 |
| 2015/0310793 A1* | 10/2015 | Kawashima | G09G 3/3233 | 345/174 |
| 2015/0347807 A1* | 12/2015 | Weber | G06K 9/0002 | 382/124 |
| 2016/0092026 A1* | 3/2016 | Stevenson | G06F 3/044 | 345/174 |
| 2016/0155385 A1* | 6/2016 | Yang | G09G 3/3233 | 345/174 |
| 2016/0180138 A1* | 6/2016 | Riedijk | G06K 9/0002 | 324/686 |
| 2016/0180619 A1* | 6/2016 | Riedijk | G01R 27/2605 | 324/679 |
| 2016/0232394 A1* | 8/2016 | Riedijk | G06K 9/0002 | |

* cited by examiner

CAPACITIVE FINGERPRINT SENSING DEVICE WITH CURRENT READOUT FROM SENSING ELEMENTS

CROSS-REFERENCE TO RELATED APPLICATIONS

This application claims the benefit of Swedish Patent Application No. 1550152-1, filed Feb. 11, 2015. The disclosure of the above application is incorporated herein by reference in its entirety.

FIELD OF THE INVENTION

The present invention relates to a capacitive fingerprint sensing device and to a method of sensing a fingerprint pattern.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, thermal etc), capacitive sensing is most commonly used, in particular in applications where size and power consumption are important issues.

All capacitive fingerprint sensors provide a measure indicative of the capacitance between each of several sensing structures and a finger placed on or moved across the surface of the fingerprint sensor.

Some capacitive fingerprint sensors passively read out the capacitance between the sensing structures and the finger. This, however, requires a relatively large capacitance between sensing structure and finger. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a capacitive fingerprint sensing system in which a driving signal is injected into the finger by pulsing a conductive structure arranged in the vicinity of the sensor array and measuring the resulting change of the charge carried by the sensing structures in the sensor array.

This type of so-called active capacitive fingerprint sensing systems generally enable measurement of the capacitance between finger and sensing structures with a much higher signal-to-noise ratio than the above-mentioned passive systems. This, in turn, allows for a considerably thicker protective coating and thus for more robust capacitive fingerprint sensors that can be included in items subjected to considerable wear, such as mobile phones.

However, there is still room for improvement. In particular, it would be desirable to provide for fingerprint sensing through even thicker protective coatings and/or for further improved performance in respect of signal-to-noise ratio.

SUMMARY

In view of the above-mentioned and other drawbacks of the prior art, it is an object of the present invention to achieve an improved capacitive fingerprint sensing device, in particular a capacitive fingerprint sensing device providing for improved sensing performance through very thick protective coatings.

According to a first aspect of the present invention, it is therefore provided a capacitive fingerprint sensing device for sensing a fingerprint pattern of a finger, the capacitive fingerprint sensing device comprising: a plurality of sensing elements, each including: a protective dielectric top layer to be touched by the finger; an electrically conductive sensing structure arranged underneath the top layer; a charge amplifier connected to the sensing structure for providing a sensing voltage signal indicative of a change of a charge carried by the sensing structure resulting from a change in a potential difference between the finger and the sensing structure, the charge amplifier comprising: a first input connected to the sensing structure; a second input; an output for providing the sensing voltage signal; a feedback capacitor connected between the first input and the output; and at least one amplifier stage between the first and second inputs, and the output; and a voltage-to-current converter for converting the sensing voltage signal to a sensing current signal indicative of the change of charge carried by the sensing structure, wherein the fingerprint sensing device further comprises readout circuitry connected to the voltage-to-current converter comprised in each of the sensing elements for receiving sensing current signals from the plurality of sensing elements and providing a representation of the fingerprint pattern based on the sensing current signals.

The voltage-to-current converter may have an input connected to the output of the charge amplifier and an output for providing the sensing current signal.

The sensing structure may advantageously be provided in the form of a conductive plate, such as a metal plate, so that a kind of parallel plate capacitor is formed by the sensing structure (the sensing plate), the local finger surface, and the protective coating (and any air that may locally exist between the local finger surface and the protective coating).

The protective coating may advantageously be at least 20 µm thick and have a high dielectric strength to protect the underlying structures of the fingerprint sensing device from wear and tear as well as from ESD. Even more advantageously, the protective coating may be at least 50 µm thick. In embodiments, the protective coating may be a few hundred µm thick.

The sensing element may be controllable to perform a predetermined measurement sequence involving transitioning between different measurement states in a predetermined sequence. A measurement state may be defined by a certain combination of control signals provided to the circuitry comprised in the sensing element.

The charge amplifier converts charge at the first input to a voltage at the output. The gain of the charge amplifier is determined by the capacitance of the feedback capacitor.

The charge amplifier may advantageously be configured in such a way that a potential at the first input of the charge amplifier substantially follows a potential at the second input.

That the charge amplifier may be configured in such a way that the potential at the first input (sometimes also referred to as the negative input) substantially follows the potential at the second input (sometimes also referred to as the positive input) should be understood to mean that a change in the potential at the second input results in a substantially corresponding change in the potential at the first input. Depending on the actual configuration of the charge amplifier, the potential at the first input may be substantially the same as the potential at the second input, or there may be a substantially constant potential difference between the second input and the first input. If, for instance, the charge amplifier is configured as a single stage amplifier, the potential difference may be the gate-source voltage of the sense transistor.

It should be noted that the output of the charge amplifier need not be directly connected to the feedback capacitor, and that there may be additional circuitry between the output and the feedback capacitor. This circuitry could also be placed outside the matrix of sensing elements.

The second input may be connected to a reference potential of the sensing element, which may be a local reference potential of the particular sensing element or a group of sensing elements, or the reference potential of the capacitive sensing device (the sensor ground). The local reference potential may be controlled to vary in relation to the sensor ground and/or in relation to the reference potential of an electronic device comprising the capacitive fingerprint sensing device. The reference potential of the electronic device may be referred to as device ground. In embodiments, the sensor ground may be controlled to vary in relation to the device ground.

The present invention is based upon the realization that faster operation of the sensing elements would allow multiple readouts from each sensing element, which would in turn provide for improved sensing performance, for example in terms of signal-to-noise ratio and common mode noise reduction.

The present inventor has further realized that the desired faster operation of the sensing elements can be achieved without a corresponding increase in power consumption by converting the voltage signal provided by the charge amplifier in each sensing element to a current signal, and transmitting the current signal over the output line out of the sensing element to readout circuitry, which may be arranged outside the sensing element matrix.

The parasitic capacitance of the output line between a sensing element and the readout circuitry arranged outside the matrix of sensing elements may be several pF. By providing the sensing signals as current instead of voltage it will not be necessary to charge and discharge this parasitic capacitance at a high frequency, which provides for a considerable reduction of the energy consumption per readout event. According to embodiments of the present invention, the energy consumption per readout event may be reduced sufficiently to allow an increase of the readout frequency by a factor of, say, 20 without increasing the power consumption of the capacitive fingerprint sensing device.

Accordingly, embodiments of the present invention provide for a higher readout frequency, which in turn allows improved sensing performance and further enables combination of multiple output signals through per se known filtering techniques, whereby the common mode noise can be reduced and the signal-to-noise ratio increased.

This in turn allows for measurement through thicker coatings, such as a control button or a part of the cover of an electronic device, such as a mobile phone. Furthermore, it may be possible to reduce the energy consumption of the fingerprint sensor and/or reduce the time needed to obtain a fingerprint representation (image).

Additionally, providing sensing signals from the sensing elements in the form of current signals facilitates readout of a reference signal indicative of the combined change of the charge carried by a group of sensing elements. The desired reference signal may be achieved by allowing each sensing element in the group of sensing elements to provide its sensing current signal to a common readout line, where the currents will automatically be added together to form the above-mentioned reference signal for the group of sensing elements.

If the sensing elements in the group of sensing elements are arranged in such a way that at least one of the sensing elements will correspond to a ridge in the fingerprint pattern, the above mentioned reference signal can be used for handling common mode noise and/or allowing for more efficient use of the dynamic range of an analog-to-digital converter (ADC) which may be comprised in the readout circuitry for providing a representation of the finger pattern in digital form.

To achieve that at least one of the sensing elements in the group of sensing elements corresponds to a fingerprint ridge, adjacent sensing elements covering a sufficiently large area and/or a sufficient number of spatially distributed sensing elements may be included in the above-mentioned group of sensing elements.

According to various embodiments, the capacitive fingerprint sensing device of the present invention may further comprise excitation signal providing circuitry for providing a time-varying excitation signal to at least one of the finger and the sensing structure for providing the change in potential difference between the finger and the sensing structure.

The excitation signal providing circuitry could be switching circuitry configured to switch between two or more different potentials provided on different lines. Alternatively or in combination, the excitation signal providing circuitry may comprise at least one signal source configured to provide a time-varying potential, such as a square wave voltage signal or a sine wave voltage signal.

The excitation signal providing circuitry may be connected to the sensing structure for providing the excitation signal to the sensing structure, or to a conductive structure to be conductively connected to the finger of a user using the capacitive fingerprint sensing device. The conductive structure may, for example, be a bezel at least partly surrounding the fingerprint sensor.

According to various embodiments, the voltage-to-current converter included in the sensing element may comprise a resistive element connected between the output of the charge amplifier and the output of the voltage-to-current converter.

The resistive element may advantageously be constituted by a MOS-transistor, such as a PMOS transistor, since this may facilitate component matching with the readout circuitry, which in turn allows for the provision of an accurate representation of the fingerprint pattern from the capacitive fingerprint sensing device.

Alternatively or in combination, the resistive element may be constituted by a resistor.

Furthermore, the readout circuitry may advantageously comprise a controllable gain element, to allow control of the readout circuitry to adapt to different current levels. For instance, the sensing current output by a single sensing element may be relatively low, while a combined sensing current (such as the above-mentioned reference signal) formed by the sum of the sensing currents output by a group of sensing elements may be relatively high. Such a controllable gain element may, for example, be provided in the form of a controllable amplifier.

According to embodiments, the readout circuitry may comprise at least one current-to-voltage converter. The voltage output by the current-to-voltage converter may be sampled at a first sampling time when there is a first potential difference between the finger and the sensing structure, and at a second sampling time when there is a second potential difference between the finger and the sensing structure. This is often referred to as correlated double sampling. Following the sampling operation, the difference between the voltage sampled at the second/first sampling time and the voltage sampled at the first/second sampling time may be provided to an analog-to-digital converter for converting a representation of the finger pattern into digital form.

The current-to-voltage converter included in the readout circuitry may comprise a so-called transimpedance amplifier, which comprises a feedback resistive element. The feedback resistive element may advantageously comprise a MOS-transistor.

In particular in embodiments where the resistive element in the voltage-to-current converter in the sensing elements is a MOS-transistor, such as a PMOS transistor, also providing a current-to-voltage converter in the readout circuitry with the same type of MOS-transistor may facilitate component matching in the voltage-to-current converter and the current-to-voltage converter, which may in turn improve the accuracy of the conversions.

The above-mentioned correlated double sampling can be seen as a demodulation of the sensing signals provided by the sensing elements. According to further embodiments, the readout circuitry may comprise a demodulator for demodulating the sensing signals in the current domain. The (current) output of the demodulator may be provided to an analog-to-digital converter. An advantage of these embodiments is that it may be easier to demodulate the sensing signals in the current domain than in the voltage domain.

According to yet further embodiments, the readout circuitry may comprise a so-called direct current analog-to-digital converter, for directly converting current values to corresponding digital representations.

According to various embodiments of the present invention, furthermore, the charge amplifier may be configured in such a way that a potential at the first input substantially follows a potential at the second input; and the excitation signal providing circuitry may be connected to the second input of the charge amplifier for changing a potential at the second input from a first potential to a second potential, to thereby change a potential of the sensing structure, thereby providing the change in potential difference between the finger and the sensing structure.

By changing the potential of the sensing structure, a potential difference between finger and sensing structure can be achieved, which is substantially independent of whether the finger is wet/normal or dry. This in turn provides for improved sensing of finger patterns of, for example, dry fingers.

According to various embodiments, the amplifier stage comprised in the charge amplifier may comprise a sense transistor having a gate constituting the first input. The sense transistor may be formed in a well in a semiconductor substrate, an interface between the well and the substrate being configured in such a way that current can be prevented from flowing between the well and the substrate. Furthermore, the excitation signal providing circuitry may be connected to the well for changing a potential of the well from a third potential to a fourth potential, a difference between the third potential and the fourth potential being substantially equal to a difference between the above-mentioned first potential and second potential, to thereby reduce an influence of a parasitic capacitance between the sensing structure and the well.

The semiconductor substrate may advantageously be a doped semiconductor substrate, and the well may be a portion of the substrate doped to opposite polarity with respect to the semiconductor substrate (if the semiconductor substrate is p-doped, the well may be n-doped, and if the semiconductor substrate is n-doped, the well may be p-doped. This is one way of achieving an interface between the well and the substrate that is configured in such a way that a current can be prevented from flowing between the well and the substrate. In particular, the well and the substrate may be kept at such electrical potentials that no current flows through the diode formed at the interface between the substrate and the well.

Alternatively, an insulating layer may be provided between the substrate and the well, for instance in the form of a thin layer of glass. Such an insulating layer will also prevent current from flowing between the well and the substrate.

If the excitation signal is applied to the finger, and the sensing structure is kept at a fixed potential, say ground, then the measurement of the capacitance between sensing structure and finger will not be disturbed by any parasitic capacitance between the sensing structure and the charge amplifier, and/or between the sensing structure and the semiconductor substrate in which the charge amplifier is formed, since the potential of the sensing structure and the relevant parts of the charge amplifier (and the semiconductor substrate) will be the same (or there will be a constant potential difference between the sensing structure and the input stage of the charge amplifier and the semiconductor substrate). If, however, the excitation signal is applied to the sensing structure, there will be a time varying potential difference between the sensing structure and the semiconductor substrate. Simulations show that the parasitic capacitance between the sensing structure and the semiconductor structures (typically n-well, p-well and/or semiconductor substrate) adjacent to the connection between the sensing structure and the input stage of the charge amplifier may be in the order of 10 fF, while the capacitance to be sensed (between the sensing structure and the finger) may be as low as 0.1 fF or less. Furthermore, the above-mentioned parasitic capacitance may typically be unknown and be different for different sensing elements due to variations in the semiconductor manufacturing process.

The present inventor has realized that, in embodiments of the present invention, the influence of this parasitic capacitance between sensing structure and semiconductor structures in the fingerprint sensing device can be considerably reduced by providing excitation signal providing circuitry configured to change a potential of the well in which the sense transistor of the charge amplifier is formed. Hereby, the potential of the well, which is the semiconductor structure adjacent to the connection between the sensing structure and the sense transistor (input stage of the charge amplifier) can be controlled to follow the potential of the sensing structure so that the potential difference between the well and the sensing structure is kept substantially constant, at least at points in time that are relevant to the measurement of the capacitance between the sensing structure and the finger.

Which points in time are relevant to the measurement may be different depending on the measurement method used, and the skilled person will be able to determine such points in time, for example based on circuit simulation, without undue burden. For example, in the case of so-called correlated double-sampling where the sensing signal is sampled at two sampling times, those sampling times may be the points in time that are relevant to the measurement.

According to various embodiments, moreover, the fingerprint sensing device may further comprise a shielding structure arranged between the sensing structure and the substrate. The excitation signal providing circuitry may further be connected to the shielding structure and configured to change a potential of the shielding structure from a fifth potential to a sixth potential, a difference between the fifth potential and the sixth potential being substantially equal to a difference between the above-mentioned first potential and second potential.

Hereby, the sensing structure may effectively be shielded from other possibly underlying parts of the sensing element, such as connecting lines in metal layers and/or connecting lines and/or semiconductor circuitry formed in the semiconductor substrate. This will further reduce the influence of parasitic capacitances in the sensing element.

The fifth potential may advantageously be equal to the above-mentioned third (and/or first) potential, and the sixth potential may advantageously be equal to the above-mentioned fourth (and/or second) potential. For example, the shielding structure (plate) may advantageously be directly conductively connected to the well.

According to a first set of embodiments, the sense transistor may be an NMOS-transistor or a PMOS-transistor, and the well may be a p-well or an n-well, respectively.

According to a second set of embodiments, a p-well and/or an n-well may be formed in the well being connected to the excitation signal providing circuitry. When at least one p-well and at least one n-well are formed in the well, the well may sometimes be referred to as an iso-well.

Furthermore, the well may be common to a plurality of sensing elements. For instance, the well may be an iso-well surrounding n-wells and p-wells of several sensing elements. The excitation signal providing circuitry may be connected to the iso-well and to the well(s) formed inside the iso-well, and configured to change the voltages of the iso-well and the well(s) formed inside the iso-well.

According to various embodiments, each of the sensing elements may comprise timing circuitry connected to the excitation signal providing circuitry for: providing a first excitation control signal to the excitation signal providing circuitry for triggering a first change in the potential difference between finger and sensing structure at a first excitation transition time; and providing a second excitation control signal to the excitation signal providing circuitry for triggering a second change in the potential difference between finger and sensing structure at a second excitation transition time.

According to various embodiments, moreover, each of the sensing elements may further comprise: reset circuitry controllable to discharge the feedback capacitor; and timing circuitry connected to the reset circuitry for controlling the reset circuitry between a reset state in which the feedback capacitor is discharged, and a measurement ready state in which the feedback capacitor can be charged to allow measurement of the change of the charge carried by the sensing structure.

Through the provision of timing circuitry locally in each sensing element, at least some of the timing control of circuitry comprised in the sensing element may be locally controlled in each sensing element.

It can thus be said that the timing circuitry functions as a local state machine, which may be asynchronous or synchronous, or a combination thereof.

By providing localized timing of at least the most time critical transition(s) between measurement states, the time available for measurement can be increased (for a given readout frequency) and/or the design of the capacitive fingerprint sensing device facilitated. For instance, careful routing of certain timing control signals to each sensing element will not be necessary, but the timing can be initiated by an external signal selecting a particular sensing element.

Accordingly, these embodiments of the present invention further facilitate the realization of a higher readout frequency, which in turn allows improved measurement performance and further enables combination of multiple output signals (for example through filtering), whereby the common mode noise can be reduced and the signal-to-noise ratio increased.

The timing circuitry may advantageously comprise at least a first delay element for controlling the sensing element to transition from a first measurement state to a second measurement state at a transition time defined by a first event and a time delay in relation to the first event, the first delay element having an input for receiving a first signal defining the first event and an output for providing a second signal defining the transition from the first measurement state to the second measurement state.

The first signal may be a time-varying voltage, and the first event may, for instance, be defined by a rising flank or falling flank of the first signal.

The first signal may be generated internally in the sensing element, or may, according to various embodiments, be provided as a signal, which may, for example, be referred to as an activation signal or selection signal, generated outside the sensing element.

The second signal may be seen as a delayed version of the first signal, but it should be understood that other transformations than a delay may have been imposed on the first signal to form the second signal. For instance, the first signal may additionally have been amplified and/or attenuated and/or inverted etc to form the second signal.

The first delay element may advantageously comprise semiconductor circuitry, such as one or more logic gates.

The capacitive fingerprint sensing device according to various embodiments of the present invention may advantageously be included in an electronic device, further comprising processing circuitry configured to: acquire the representation of the fingerprint pattern from the fingerprint sensing device; authenticate a user based on the representation; and perform at least one user-requested process only if the user is authenticated based on the representation. The electronic device may, for example, be a handheld communication device, such as a mobile phone or a tablet, a computer, or an electronic wearable item such as a watch or similar.

According to a second aspect of the present invention, there is provided a method of sensing a fingerprint pattern of a finger using a capacitive fingerprint sensor comprising a plurality of sensing elements, each including: a protective dielectric top layer to be touched by the finger; an electrically conductive sensing structure arranged underneath the top layer; and a charge amplifier connected to the sensing structure for providing a sensing voltage signal indicative of a change of a charge carried by the sensing structure resulting from a change in a potential difference between the finger and the sensing structure, the charge amplifier comprising: a first input connected to the sensing structure; a second input; an output for providing the sensing voltage; a feedback capacitor connected between the first input and the output; and at least one amplifier stage between the first and second inputs, and the output, wherein the method comprises the steps of: changing the potential difference between the finger and the sensing structure; providing the sensing voltage; converting, in the sensing element, the sensing voltage to a sensing current; and receiving, using readout circuitry external to the sensing elements, sensing currents from each of the sensing elements and providing a representation of the fingerprint pattern based on the received sensing currents.

Further embodiments of, and effects obtained through this second aspect of the present invention are largely analogous to those described above for the first aspect of the invention.

In summary, the present invention relates to a capacitive fingerprint sensing device comprising a plurality of sensing elements. Each sensing element includes a protective dielectric top layer to be touched by a finger; an electrically conductive sensing structure arranged underneath the top layer; a charge amplifier connected to the sensing structure for providing a sensing voltage signal indicative of a change of a charge carried by the sensing structure resulting from a change in a potential difference between the finger and the sensing structure; and a voltage-to-current converter for converting the sensing voltage signal to a sensing current signal indicative of the change of charge carried by the sensing structure. Hereby, accurate sensing as well as faster operation of the sensing elements can be achieved without a corresponding increase in power consumption.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the fingerprint sensing device and method according to the present invention are mainly described with reference to a capacitive fingerprint sensing device, in which each sensing element comprises excitation signal providing circuitry for providing an excitation or drive signal to the sensing structure. Moreover, the capacitive fingerprint sensing device is illustrated as a touch sensor dimensioned and configured to acquire a fingerprint representation from a stationary finger.

It should be noted that this by no means limits the scope of the present invention, which equally well includes, for example, a capacitive fingerprint sensing device in which the change in potential difference between finger potential and sensing structure potential is instead achieved by providing the excitation signal to the finger directly or via other sensing elements than one or several sensing element(s) presently selected for sensing. Such other sensing elements may be programmed to function as drive elements. Other sensor array configurations, such as a so-called swipe sensor (or line sensor) for acquiring a fingerprint representation from a moving finger, are also within the scope of the present invention as defined by the appended claims. A touch sensor may also have other dimensions than those illustrated in the appended drawings.

Figure 1:
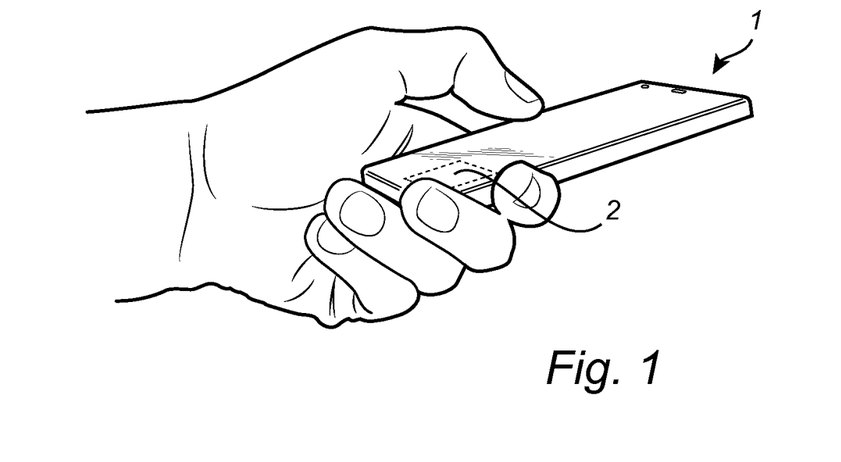
FIG. 1 schematically illustrates a mobile phone comprising a fingerprint sensing system according to an example embodiment of the present invention.

FIG. 1 schematically illustrates an application for a fingerprint sensing device according to an example embodiment of the present invention, in the form of a mobile phone 1 with an integrated fingerprint sensing device 2. The fingerprint sensing device 2 may, for example, be used for unlocking the mobile phone 1 and/or for authorizing transactions carried out using the mobile phone, etc.

Figure 2:
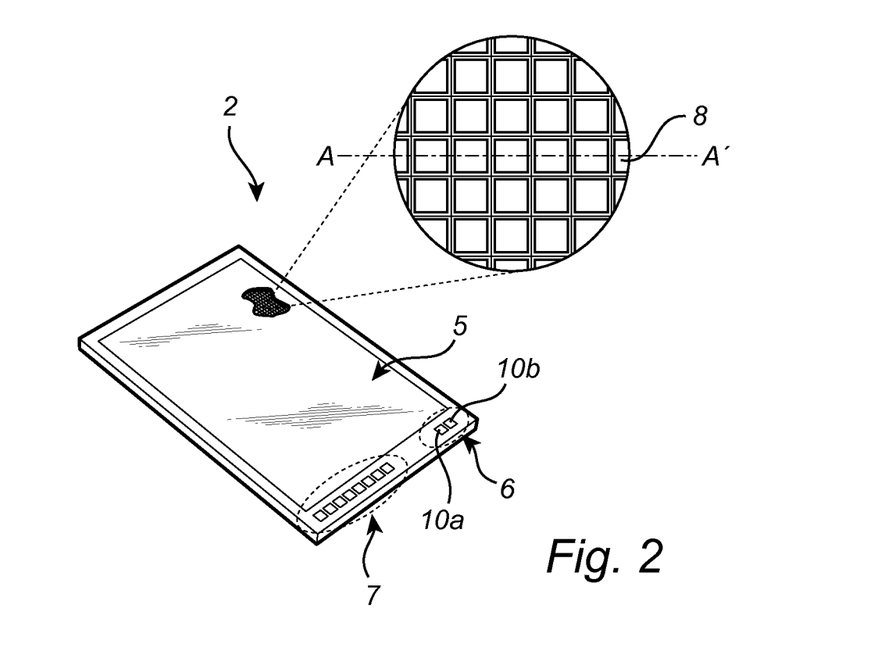
FIG. 2 schematically shows the fingerprint sensing device in FIG. 1.

FIG. 2 schematically shows the fingerprint sensing device 2 comprised in the mobile phone 1 in FIG. 1. As can be seen in FIG. 2, the fingerprint sensing device 2 comprises a sensor array 5, a power supply interface 6 and a communication interface 7. The sensor array 5 comprises a large number of sensing elements 8 (only one of the sensing elements has been indicated with a reference numeral to avoid cluttering the drawing), each being controllable to sense a distance between a sensing structure comprised in the sensing element 8 and the surface of a finger contacting the top surface of the sensor array 5.

The power supply interface 6 comprises first 10a and second 10b contact pads, here shown as bond pads, for connection of a supply voltage $V_{supply}$ to the fingerprint sensor 2.

The communication interface 7 comprises a number of bond pads for allowing control of the fingerprint sensor 2 and for acquisition of fingerprint data from the fingerprint sensor 2.

Figure 3:
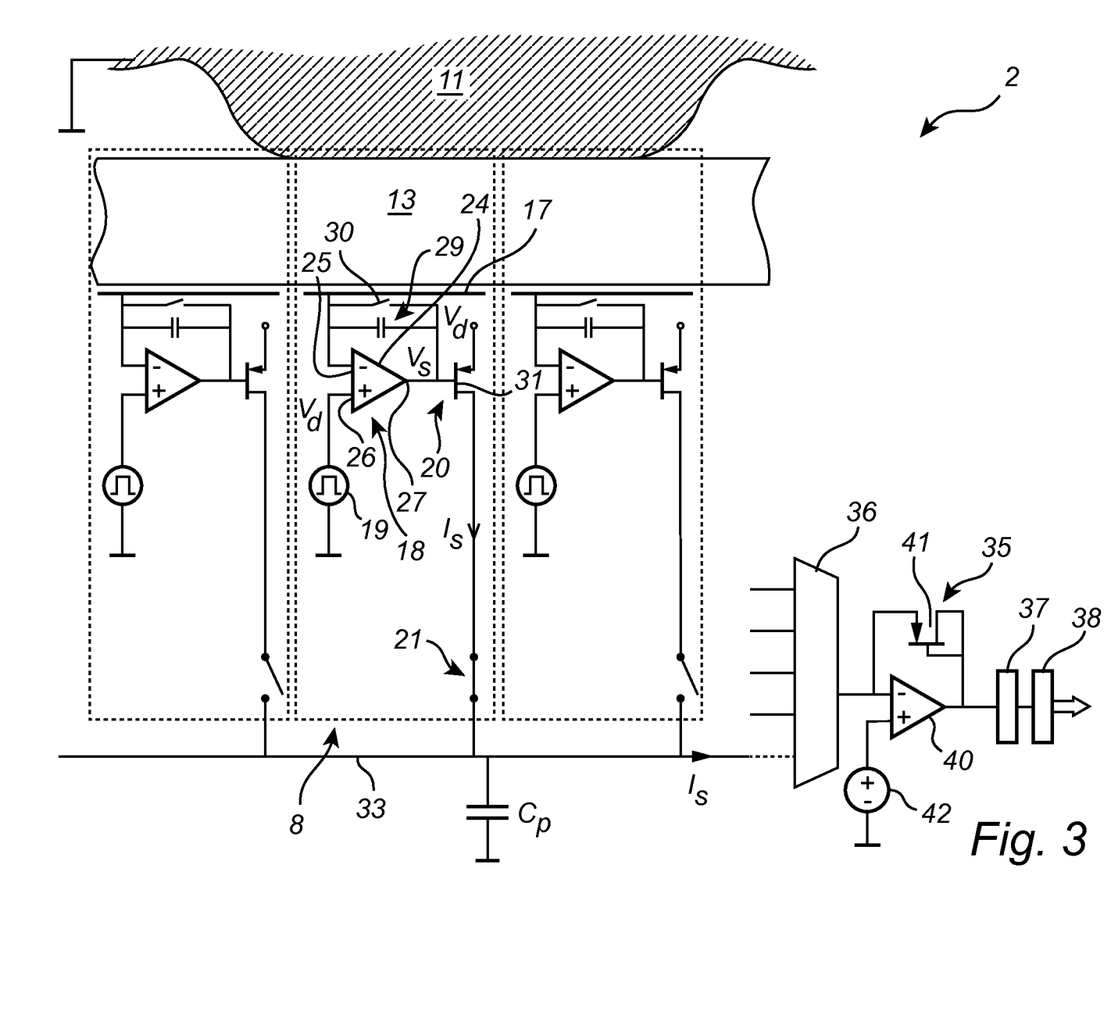
FIG. 3 is a schematic cross-section view of a portion of the fingerprint sensing device in FIG. 2 illustrating a first embodiment of the fingerprint sensing device according to the present invention using circuit schematics to illustrate the configuration of the sensing elements and the transmission of sensing signals from the sensing elements to the readout circuitry.

FIG. 3 is a schematic cross section of a portion of the fingerprint sensing device 2 in FIG. 2 taken along the line A-A' as indicated in FIG. 2 with a finger 11 placed on top of the sensor array 5. Referring to FIG. 3, the fingerprint sensing device 2 comprises a plurality of sensing elements 8, each comprising a protective dielectric top layer 13, a conductive sensing structure, here in the form of a metal plate 17 underneath the protective dielectric top layer 13, a charge amplifier 18, excitation signal generating circuitry 19, a voltage-to-current converter 20, and selection circuitry, here functionally illustrated as a simple selection switch 21 for allowing selection/activation of the sensing element 8.

The charge amplifier 18 comprises at least one amplifier stage, here schematically illustrated as an operational amplifier (op amp) 24 having a first input (negative input) 25 connected to the sensing structure 17, a second input (positive input) 26 connected to the excitation signal providing circuitry 19, and an output 27. In addition, the charge amplifier 18 comprises a feedback capacitor 29 connected between the first input 25 and the output 27, and reset circuitry, here functionally illustrated as a switch 30, for allowing controllable discharge of the feedback capacitor 29. The charge amplifier 18 may be reset by operating the reset circuitry 30 to discharge the feedback capacitor 29.

As is often the case for an op amp 24 in a negative feedback configuration, the voltage at the first input 25 follows the voltage applied to the second input 26. Depending on the particular amplifier configuration, the potential at the first input 25 may be substantially the same as the potential at the second input 26, or there may be a substantially fixed offset between the potential at the first input 25 and the potential at the second input 26.

When a time-varying potential is provided to the second input 26 of the charge amplifier 18 by the excitation signal providing circuitry 19, a corresponding time-varying potential is thus provided to the sensing structure 17 via the first input 25 of the charge amplifier 18.

Since the potential of the finger 11 can be considered to be substantially constant in the relevant time scale, the time-varying potential at the sensing structure 17 will result in a time-varying potential difference between the sensing structure 17 and the finger 11. The finger 11 is schematically indicated as being "grounded" in FIG. 3. It should be understood that the finger "ground" may be different from the sensor ground. For instance, the finger may be at the ground potential of the electronic device in which the capacitive fingerprint sensing device is included. Alternatively, the body may be considered to have such a large electrical "mass" that the potential of the finger remains substantially constant when the potential of the reference structure 17 varies.

As will be described in more detail further below, the above-described change in potential difference between the finger 11 and the reference structure 17 results in a sensing voltage signal $V_s$ on the output 27 of the charge amplifier 18. The sensing voltage signal $V_s$ is converted to a sensing current signal $I_s$ by the current-to-voltage converter 20, which is here provided as a PMOS-transistor 31 with the source connected to the above-mentioned time-varying potential $V_d$ provided by the excitation signal providing circuitry 19, the gate connected to the output 27 of the charge amplifier, and the drain connected to the readout line 33 via the selection switch 21.

When the indicated sensing element 8 is selected for sensing, the selection switch 21 is closed to provide the sensing current signal $I_s$ to the readout line 33. The readout line 33, which may be a common readout line for a row or a column of the sensor array 5 in FIG. 2, is shown in FIG. 3 to be connected to a current-to-voltage converter 35 via a multiplexer 36. As is schematically indicated in FIG. 3, additional readout lines providing sensing current signals from other rows/columns of the sensor array 5 are also connected to the current-to-voltage converter 35 via the multiplexer 36.

As is schematically indicated in FIG. 3, there is a parasitic capacitance $C_p$ between the readout line 33 and ground. If the sensing voltage signal $V_s$ were transmitted (instead of the sensing current signal $I_s$) using the readout line 33 as is generally the case in known capacitive fingerprint sensing devices, the parasitic capacitance $C_p$ would result in energy dissipation. With the readout frequency used in known capacitive fingerprint sensing devices, such as in the order of 1 MHz, the power consumption due to the parasitic capacitance of the readout line can be seen as acceptable given that the sensing device is well-designed so that the parasitic capacitance is in the order of, say, 1 pF. If, however, the readout frequency is considerably increased, to, say, 20 MHz or more, the power consumption due to the parasitic capacitance $C_p$ would become substantial. By instead transmitting the sensing current signal $I_s$ along the readout line 33, the power consumption due to the parasitic capacitance $C_p$ can be practically eliminated, since the potential difference between the readout line 33 and sensor ground can be kept substantially constant.

The current-to-voltage converter 35, here schematically shown as a so-called transimpedance amplifier, converts the sensing current signal $I_s$ back to the voltage domain and provides a sensing voltage signal to sample-and-hold circuitry 37. The current-to-voltage converter 35 in FIG. 3 comprises an operational amplifier 40, a diode-connected PMOS-transistor 41 as resistive feedback element, and a bias voltage source 42 connected to the positive input of the operational amplifier 40. Since the negative input of the op amp 40 is virtually grounded (exhibiting a potential that follows the potential at the positive input of the op amp 40), there will be a constant potential at the input of the current-to-voltage converter 35 even though the sensing current varies. Accordingly, no energy will be wasted on charging and discharging the parasitic $C_p$.

The output of the sample-and-hold circuitry 37 is connected to an analog-to-digital converter 38 for converting the analog signals originating from the sensing elements 8 to a digital representation of the fingerprint pattern of the finger 11 on the sensor 2.

Exemplary operation of the capacitive fingerprint sensing device 2 in FIG. 3 will now be described with reference to FIGS. 4a-d.

Figures 4A, 4B, 4C:
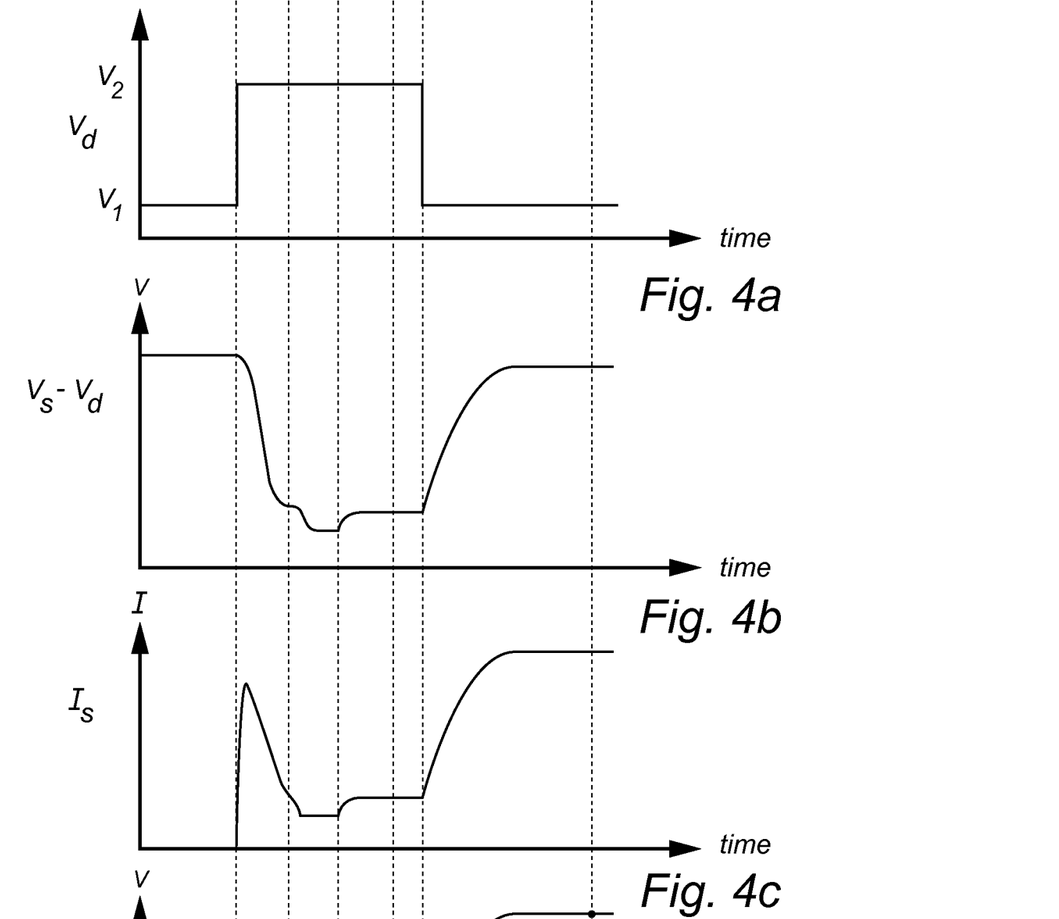
FIGS. 4a-d are timing diagrams schematically illustrating operation of the fingerprint sensing device in FIG. 3.
Figure 4D:
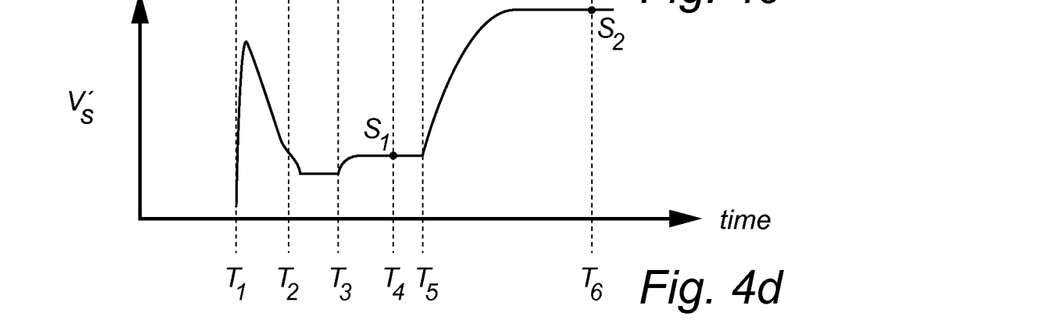

In the schematic diagrams of FIGS. 4a-d, FIG. 4a shows the drive signal $V_d$ provided by the excitation signal providing circuitry 19 in FIG. 3, FIG. 4b shows the sensing voltage signal $V_s$ at the output 27 of the charge amplifier 18 in FIG. 3 minus the drive signal $V_d$, FIG. 4c shows the sensing current signal $I_s$, and FIG. 4d shows the output voltage $V_s'$ of the current-to-voltage converter 35.

Referring first to FIG. 4a, the sensing element 8 is selected by, for instance, closing the selection switch 21, and the drive signal $V_d$ goes from a low first potential $V_1$ to a high second potential $V_2$ at a first time $T_1$. As a result, the level-shifted sensing voltage signal $V_s - V_d$ goes from a high potential to a low potential as is schematically indicated in FIG. 4b.

Before the selection switch 21 is closed, there is no sensing current signal $I_s$ (the current is 0 A), and, consequently the output voltage $V_s'$ of the current-to-voltage converter 35 is 0 V (in relation to the reference potential of the current-to-voltage converter 35). This is schematically indicated in FIGS. 4c-d.

When the selection switch 21 is closed at the time $T_1$, the sensing current signal $I_s$ rises to a current corresponding to the level-shifted sensing voltage signal $V_s - V_d$.

At the time $T_2$, the reset circuit 30 is controlled to its conducting state to reset the charge amplifier 18 by discharging the feedback capacitor 29.

At a third time $T_3$, the reset circuit 30 is controlled from its conducting state to its non-conducting state (schematically illustrated in FIG. 3) to allow the charge amplifier 18 to provide a sensing voltage signal $V_s$ at its output that is indicative of the change of the charge carried by the sensing structure 17. When the reset circuit 30 is controlled from its conducting state to its non-conducting state, there may be a small charge injection resulting in the change of the (level-shifted) sensing voltage signal shown in FIG. 4b at the time $T_3$.

As can be seen in FIG. 4c and FIG. 4d, the sensing current signal $I_s$ and the output voltage $V_s'$ of the current-to-voltage converter 35 follow the level-shifted sensing voltage signal $V_s$–$V_d$ at the output 27 of the charge amplifier 18 in the sensing element 8.

At the time $T_4$, the output voltage $V_s'$ of the current-to-voltage converter 35 is sampled a first time by the sample-and-hold circuitry 37, resulting in a first sampled value $S_1$.

Subsequently, at the time $T_5$, the drive signal $V_d$ goes back from the second potential $V_2$ to the first potential $V_1$. This results in a change in the potential difference between the finger 11 and the sensing structure 17, which in turn results in a change in the charge on the sensing structure 17 resulting from capacitive coupling with the finger 11. This change in charge is translated into a change in the voltage provided by the charge amplifier, that is, a change in the sensing voltage signal $V_s$. As was mentioned above, this change in the sensing voltage signal $V_s$ translates to corresponding changes in the sensing current signal Is and the output voltage $V_s'$ of the current-to-voltage converter 35.

When the sensing voltage signal $V_s$ (and the sensing current signal $I_s$ and the output voltage $V_s'$ of the current-to-voltage converter 35) has stabilized, at the time $T_6$, the output voltage $V_s'$ of the current-to-voltage converter 35 is sampled a second time by the sample-and-hold circuitry 37, resulting in a second sampled value $S_2$.

The difference between $S_2$ and $S_1$, which is a measure indicative of the capacitive coupling between the sensing plate 17 and the finger 11, is provided to the ADC 38 to be digitized and output as, for instance, a pixel value in a fingerprint pattern image.

Having now described the general configuration of a fingerprint sensing device according to embodiments of the present invention together with exemplary operation of the fingerprint sensing device, another embodiment providing for further improved high frequency readout performance through local timing control in each sensing element will be described below with reference to FIGS. 5a-e.

Figure 5A:
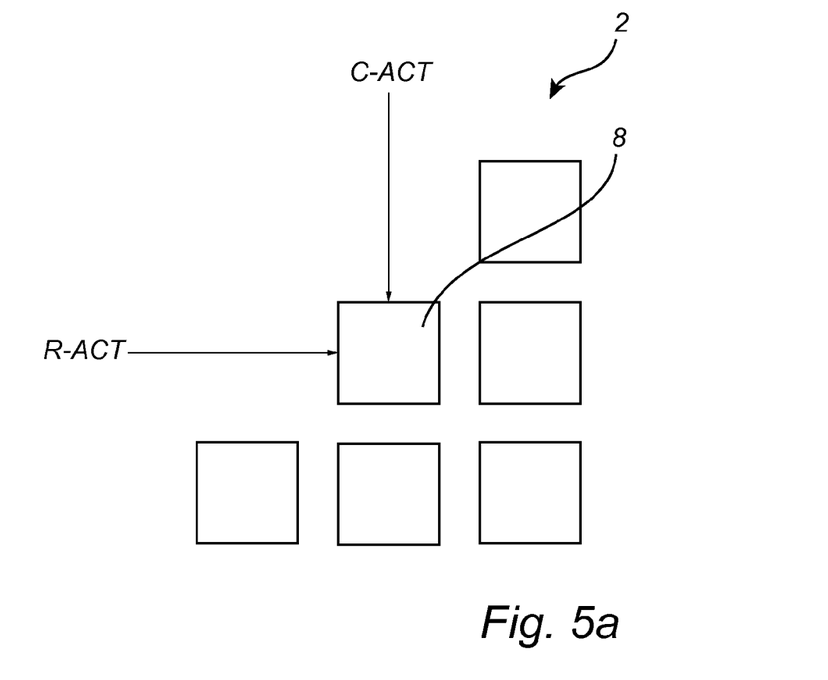
FIGS. 5a-e schematically illustrate a second embodiment of the fingerprint sensing device according to the present invention, in which each sensing element comprises timing circuitry.

Referring first to FIG. 5a, a sensing element 8 from the sensor array 5 in FIG. 2 is shown together with its closest neighbors. The sensing element(s) 8 to be sensing the capacitive coupling between its sensing structure 17 and the finger 11 may be selected using activation signals from row selection circuitry and column selection circuitry. Such activation signals are indicated as R-ACT and C-ACT in FIG. 5a.

Figure 5B:
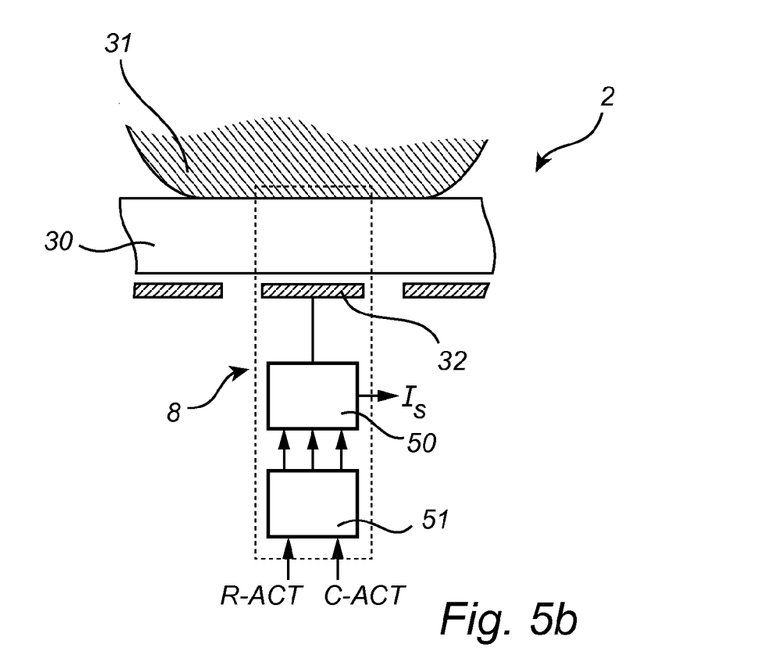

Referring to FIG. 5b, each sensing element 8 in the capacitive fingerprint sensing device 2 comprises charge measuring circuitry 50 (such as the charge amplifier 18, excitation signal providing circuitry 19, and voltage-to-current converter 20 in FIG. 3) and timing circuitry 51.

The charge measuring circuitry 50 is connected to the sensing structure (plate) 17 for measuring the change of the charge carried by the sensing structure 17 resulting from a change in a potential difference between the finger 11 and the sensing structure 17. This measurement is, as was described above with reference to FIGS. 4a-d, carried out by performing a measurement sequence comprising transitioning through a sequence of measurement states. The charge measuring circuitry 50 has an output for providing the above-mentioned sensing current signal $I_s$ to the readout line 33.

The timing circuitry 51 is connected to the charge measuring circuitry 50 for controlling a timing of at least one of the measurement states.

As is schematically illustrated in FIG. 5b, the timing circuitry may receive one or several control signals for triggering a measurement operation of the sensing element 8. For instance, the above-mentioned row and column activation signals R-ACT and C-ACT may be received by the timing circuitry 51, which thereafter may independently provide to the charge measuring circuitry 50 various timing control signals as is schematically indicated by the arrows in FIG. 5b.

Through this local control of the timing of at least one of the measurement states comprised in the measurement sequence, the timing of transitions between measurement states can be more precisely and/or uniformly controlled, which allows for shorter times between transitions, which in turn allows for a higher measurement frequency.

Figure 5C:
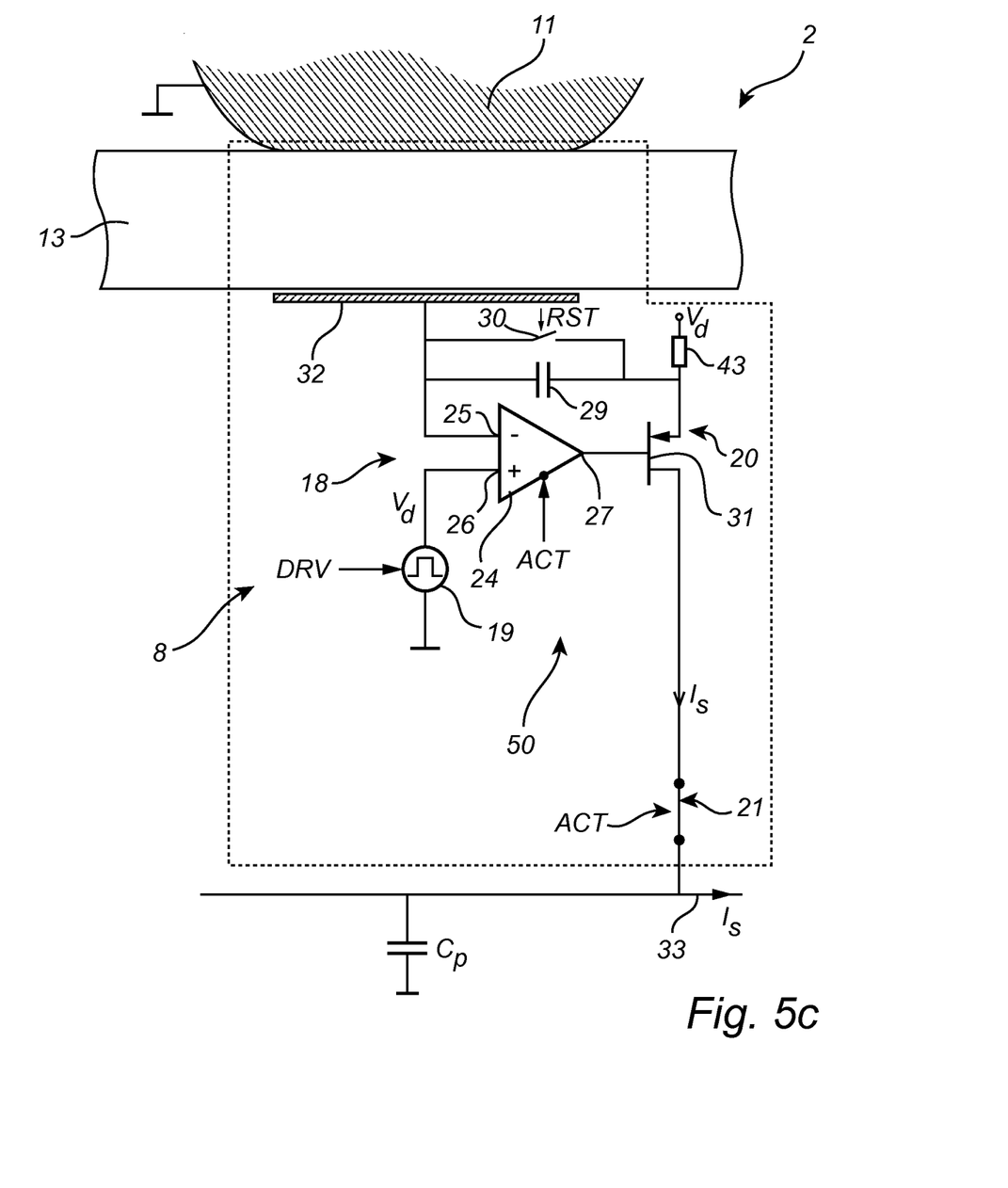

An example of the charge measuring circuitry 50 in FIG. 5b is shown in greater detail FIG. 5c.

In addition, control signals provided by the timing circuitry 51 (the activation signal ACT, the reset signal RST, and the drive control signal DRV) are indicated by arrows in FIG. 5c.

The charge measuring circuitry in FIG. 5c differs from that described above with reference to FIG. 3 in that the PMOS-transistor 31 has been included in the feedback loop, between the feedback capacitor 29 and the output 27 of the op amp 24. A series resistor 43 has also been added. It should be noted that the voltage-to-current converter configurations described herein are only some illustrative examples of suitable configurations, and that many other configurations can be implemented without undue burden for one skilled in the art.

Figure 5D:
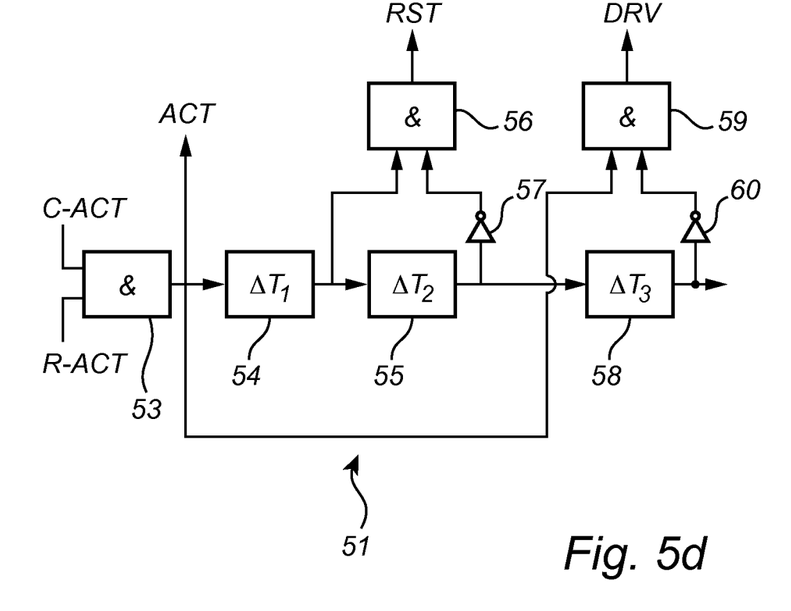

With reference to FIG. 5d, an exemplary configuration of the timing circuit 51 in FIG. 5b will now be described. As can be seen in FIG. 5d, the timing circuit 51 comprises a first AND-gate 53, a first delay element 54, a second delay element 55, a second AND-gate 56, a first inverter 57, a third delay element 58, a third AND-gate 59, and a second inverter 60.

As is schematically indicated in FIG. 5d, the row activation signal R-ACT and the column activation signal C-ACT are input to the first logic AND-gate 53. Referring also to FIG. 5c, the output of the first AND-gate 53 is provided to the amplifier 24 of the charge measuring circuitry 50 and the selection switch 21 as an activation/selection signal ACT, to the input of the first delay element 54, and to the third AND-gate 58. The output of the first delay element 54 is provided to the second AND-gate 56, and to the input of the second delay element 55. The output of the second delay element 55 is provided to the second AND-gate 56 via the first inverter 57 and to the input of the third delay element 58. The output of the third delay element 58 is provided to the input of the third AND-gate 59 via the second inverter 60.

When the sensing element 8 comprising the charge measuring circuitry 50 in FIG. 5c and the timing circuit 51 in FIG. 5d is selected by setting both the row activation signal R-ACT and the column activation signal C-ACT high, the activation signal ACT for the sensing element 8 goes high (at the time $T_1$ in FIGS. 4a-d). The output from the first AND-gate 53 passes through the first delay element 54 and is delayed by a first time delay $\Delta T_1$ to provide a first delayed version of the activation signal ACT to the second AND-gate 56. The first time delay $\Delta T_1$ corresponds to $T_2$–$T_1$ in FIGS. 4a-d.

The output from the first delay element 54 is also provided to the input of the second delay element 55, and is delayed to provide a second delayed version of the activation signal ACT.

The second delayed version of the activation signal ACT is provided to the input of the second AND-gate 56 via the first inverter 57 to achieve the reset control signal RST on the output of the second AND-gate 56.

The second time delay $\Delta T_2$ corresponds to $T_3$-$T_2$ in FIG. 4 and determines the duration of the measurement state in which the reset control signal RST is high (the reset circuit 30 is controlled to be conducting).

As is indicated in FIG. 5d, the output from the second delay element 55 also passes through the third delay element 58. The thus delayed signal (the activation signal ACT delayed by $\Delta T_{tot}=\Delta T_1+\Delta T_2+\Delta T_3$) is provided to the third AND-gate 59 via the second inverter 60. The total delay time $\Delta T_{tot}$ corresponds to $T_5$-$T_1$ in FIGS. 4a-d and controls the operation of the excitation signal providing circuitry 19 as indicated in FIG. 5c.

It should be noted that the timing circuit 51 is a simplified example for illustrating the principle of using a combination of delay elements and logic gates for locally controlling the timing of measurement states of the charge measuring circuitry 50 comprised in the sensing element 8. Depending on the actual implementation, the timing circuitry may comprise additional or other circuitry for, for instance, signal shaping and/or timing. Based on the description provided herein, the skilled person will be able to design a suitable implementation of a timing circuit without undue burden.

It should be understood at fewer or additional timing control signals may be independently provided from the timing circuitry 51 to the charge measuring circuitry 50 depending on the particular embodiment.

Figure 5E:
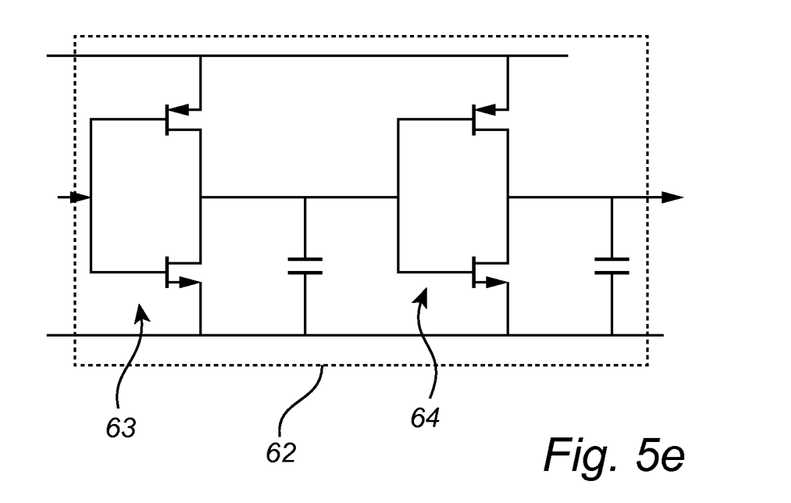

FIG. 5e shows an illustrative example of a delay element 62 which may be comprised in the timing circuitry 51 in FIG. 5d.

The delay element 62 comprises a first CMOS-inverter 63 and a second CMOS-inverter 63 connected in series. The time delay of this delay element will depend on the dimensioning of the components comprised in the delay element 62, and the time delay can thus be set when designing the delay element. If considerably longer delay times are desired, further CMOS-inverters can be coupled in series.

A third embodiment of the fingerprint sensing device 2 in FIG. 2 will now be described with reference to FIGS. 6a-b. The embodiment of FIGS. 6a-b provides for removal or at least a considerable reduction of the influence of parasitic capacitances in the sensing element 8, which in turn further facilitates high frequency operation of the sensing element 8.

Figure 6A:
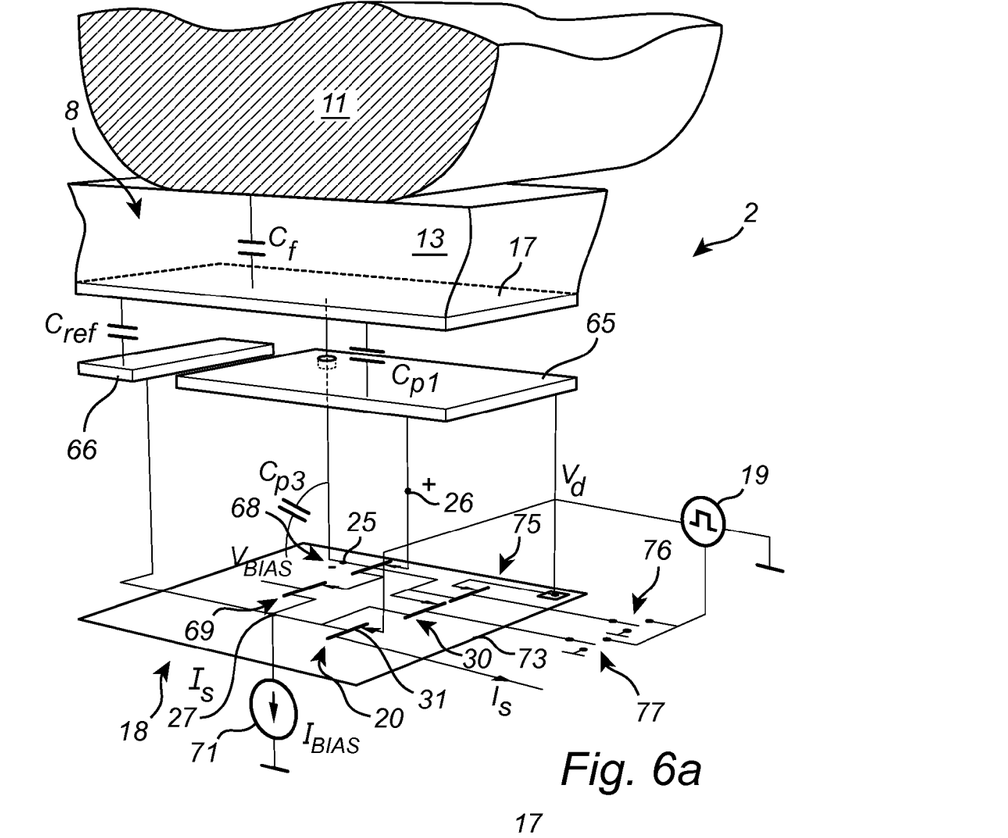
FIGS. 6a-b schematically illustrate a third embodiment of the fingerprint sensing device according to the present invention.

FIG. 6a is a hybrid of a partly structural and partly circuit schematic illustration of an embodiment of the sensing element 8 in FIG. 2 formed on a doped semiconductor substrate. The protective dielectric layer 13, the sensing plate 17, the shielding plate 65 and the reference plate 66 are schematically shown in an exploded perspective view, while the charge amplifier 18 is illustrated in the form of a transistor level circuit schematic.

As is shown in FIG. 6a, this example of a simple charge amplifier 18 comprises sense transistor 68, cascode transistor 69, reset circuitry in the form of reset transistor 30 and bias current source 71. The sense transistor 68, the cascode transistor 69 and the reset transistor 30 are all formed in the same well 73 (n-well, p-well or iso-well).

Figure 6B:
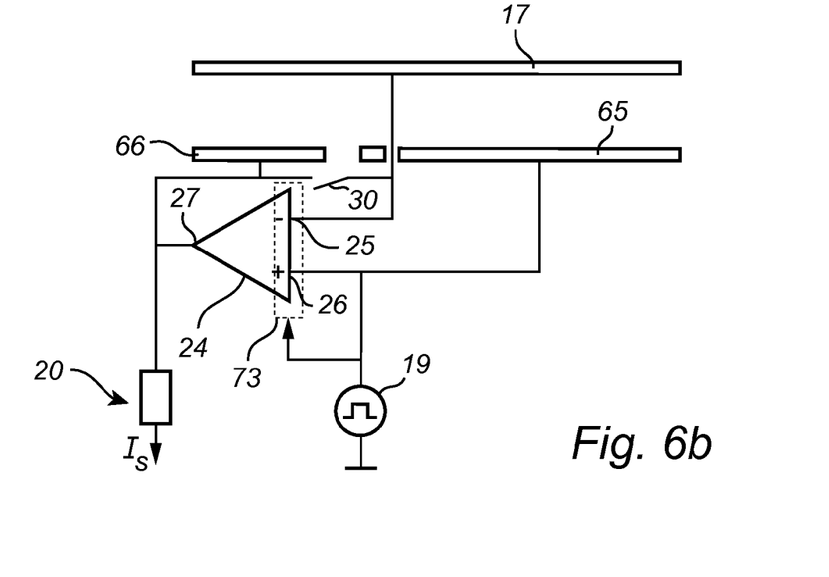

To aid the understanding of the parts and connections in FIG. 6a, the same schematic configuration is also shown in FIG. 6b, on a more abstract level with the transistor circuitry of FIG. 6a replaced by a general symbol for a charge amplifier having its negative input 25 connected to the sensing plate 17, its positive input 26 connected to excitation signal providing circuitry 19, here in the form of a pulse generator, and its output 27 providing a sensing voltage signal $V_s$ indicative of the change in charge carried by the sensing plate 17 resulting from a change in a potential difference between the finger 11 and the sensing plate 17. As was explained above, the change in potential difference between the finger 11 and the sensing plate 17 results from the changing electric potential applied to the sensing plate 17 by the pulse generator 19 via the charge amplifier. A feedback capacitor, formed by the sensing plate 17 and the reference plate 66, is connected between the negative input 25 and the output 27 of the charge amplifier. It should be noted that the general functionality of a charge amplifier is well known to one of ordinary skill in the relevant art. FIG. 6b also schematically indicates that the well 73 is connected to the excitation signal providing circuitry 19, and that the sensing voltage signal $V_s$ is converted to a sensing current signal $I_s$ by the voltage-to-current converter 20.

Returning to FIG. 6a, it can be seen that the gate of the sense transistor 66 constitutes the negative input 25 of the charge amplifier and that the source of the sense transistor 66 constitutes the positive input 26 of the charge amplifier. The positive input 26 of the charge amplifier is connected to the shielding plate 65, which is in turn connected to the well 73 in which the sense transistor 68 is formed, and to the pulse generator 19.

The sensing element 8 further comprises a drive transistor 75, a drive control switch 76 and a reset control switch 77. The drive control switch 76 is controllable between a first state in which the gate of the drive transistor 75 is connected to the pulse generator 19 and a second state in which the gate of the drive transistor 75 is connected to sensor ground. When the drive control switch 76 is in its first state, the drive transistor 75 will be conducting and thus connect the sensing structure 17 directly to the pulse generator 19. When the drive control switch is in its second state, the drive transistor 75 will be non-conducting. In the latter case, there will thus be no direct connection through the drive transistor 75 between the sensing structure 17 and the pulse generator 19. As can be seen in FIG. 6a, the drive transistor 75 is formed in the well 73. The bias current source 71 can be in the sensing element or outside the sensor array 5.

In the same way, the reset control switch 77 is controllable between a first state in which the reset transistor 30 is non-conducting to allow a potential difference between the sensing plate 17 and the feedback plate 66, and a second state in which the reset transistor 30 is conducting to equalize the potentials of the sensing plate 17 and the feedback plate 66.

As was described further above with reference to FIG. 3, the sensing element 8 in FIG. 6a further comprises current-to-voltage converter 20, provided as a PMOS-transistor 31 with the source connected to the pulse generator 19, the gate connected to the output 27 of the amplifier, and the drain providing the sensing current $I_s$.

Through the configuration of the sensing element 8 in FIG. 6a, the influence of the internal parasitic capacitances $C_{p1}$ and $C_{p3}$ is removed or at least considerably reduced. Furthermore, driving neighboring sensing structures will remove or at least considerably reduce the influence of the parasitic capacitance between neighboring sensing plates.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A capacitive fingerprint sensing device for sensing a fingerprint pattern of a finger, said capacitive fingerprint sensing device comprising:
 a plurality of sensing elements, each including:
  a protective dielectric top layer to be touched by said finger;
  an electrically conductive sensing structure arranged underneath said top layer;
  a charge amplifier connected to said sensing structure for providing a sensing voltage signal indicative of a change of a charge carried by said sensing structure resulting from a change in a potential difference between said finger and said sensing structure, said charge amplifier comprising:
   a first input connected to said sensing structure;
   a second input;
   an output for providing said sensing voltage signal;
   a feedback capacitor connected between said first input and said output; and
   at least one amplifier stage between said first and second inputs, and said output; and
  a voltage-to-current converter for converting said sensing voltage signal to a sensing current signal indicative of said change of charge carried by said sensing structure,
 wherein said fingerprint sensing device further comprises readout circuitry connected to the voltage-to-current converter comprised in each of said sensing elements for receiving sensing current signals from said plurality of sensing elements and providing a representation of said fingerprint pattern based on said sensing current signals.

2. The capacitive fingerprint sensing device according to claim 1, further comprising excitation signal providing circuitry for providing a time-varying excitation signal to at least one of said finger and said sensing structure for providing said change in potential difference between said finger and said sensing structure.

3. The capacitive fingerprint sensing device according to claim 1, wherein said readout circuitry comprises at least one current-to-voltage converter.

4. The capacitive fingerprint sensing device according to claim 3, wherein said current-to-voltage converter comprises a transimpedance amplifier.

5. The capacitive fingerprint sensing device according to claim 4, wherein a feedback element comprised in said transimpedance amplifier is constituted by a MOS transistor.

6. The capacitive fingerprint sensing device according to claim 2, wherein:
 said charge amplifier is configured in such a way that a potential at said first input substantially follows a potential at said second input; and
 said excitation signal providing circuitry is connected to said second input of the charge amplifier for changing a potential at said second input from a first potential to a second potential, to thereby change a potential of said sensing structure, thereby providing said change in potential difference between said finger and said sensing structure.

7. The capacitive fingerprint sensing device according to claim 6, wherein said amplifier stage comprised in the charge amplifier comprises a sense transistor having a gate constituting said first input,
 wherein said sense transistor is formed in a well in a semiconductor substrate, an interface between said well and said substrate being configured in such a way that current can be prevented from flowing between said well and said substrate,
 wherein said excitation signal providing circuitry is connected to said well for changing a potential of said well from a third potential to a fourth potential, a difference between said third potential and said fourth potential being substantially equal to a difference between said first potential and said second potential, to thereby reduce an influence of a parasitic capacitance between said sensing structure and said well.

8. The fingerprint sensing device according to claim 7, further comprising a shielding structure arranged between said sensing structure and said substrate,
 wherein said excitation signal providing circuitry is further connected to said shielding plate and configured to change a potential of said shielding plate from a fifth potential to a sixth potential, a difference between said fifth potential and said sixth potential being substantially equal to a difference between said first potential and said second potential.

9. The capacitive fingerprint sensing device according to claim 2, wherein each of said sensing elements comprises timing circuitry connected to said excitation signal providing circuitry for:
 providing a first excitation control signal to said excitation signal providing circuitry for triggering a first change in said potential difference at a first excitation transition time; and
 providing a second excitation control signal to said excitation signal providing circuitry for triggering a second change in said potential difference at a second excitation transition time.

10. The capacitive fingerprint sensing device according to claim 1, wherein each of said sensing elements further comprises:
 reset circuitry controllable to discharge the feedback capacitor; and
 timing circuitry connected to said reset circuitry for controlling said reset circuitry between a reset state in which said feedback capacitor is discharged, and a measurement ready state in which said feedback capacitor can be charged to allow measurement of said change of the charge carried by said sensing structure.

11. The capacitive fingerprint sensing device according to claim 9, wherein said timing circuitry comprises at least a first delay element for controlling said sensing element to transition from a first measurement state to a second measurement state at a transition time defined by a first event and a time delay in relation to said first event,
 said first delay element having an input for receiving a first signal defining said first event and an output for providing a second signal defining said transition from the first measurement state to the second measurement state.

12. An electronic device comprising:
 the fingerprint sensing device according to claim 1; and
 processing circuitry configured to:

acquire said representation of said fingerprint pattern from the fingerprint sensing device;
authenticate a user based on said representation; and
perform at least one user-requested process only if said user is authenticated based on said representation.

13. A method of sensing a fingerprint pattern of a finger using a capacitive fingerprint sensor comprising a plurality of sensing elements, each including:
a protective dielectric top layer to be touched by said finger;
an electrically conductive sensing structure arranged underneath said top layer; and
a charge amplifier connected to said sensing structure for providing a sensing voltage signal indicative of a change of a charge carried by said sensing structure resulting from a change in a potential difference between said finger and said sensing structure, said charge amplifier comprising:
a first input connected to said sensing structure;
a second input;
an output for providing said sensing voltage;
a feedback capacitor connected between said first input and said output; and
at least one amplifier stage between said first and second inputs, and said output,
wherein said method comprises the steps of:
changing said potential difference between said finger and said sensing structure;
providing, by the charge amplifier, said sensing voltage;
converting, in said sensing element, said sensing voltage to a sensing current; and
receiving, using readout circuitry external to said sensing elements, sensing currents from each of said sensing elements and providing a representation of said fingerprint pattern based on said received sensing currents.

* * * * *